(No Model.)
W. E. MOORE.
CHECKREIN HOOK.
No. 376,899. Patented Jan. 24, 1888.
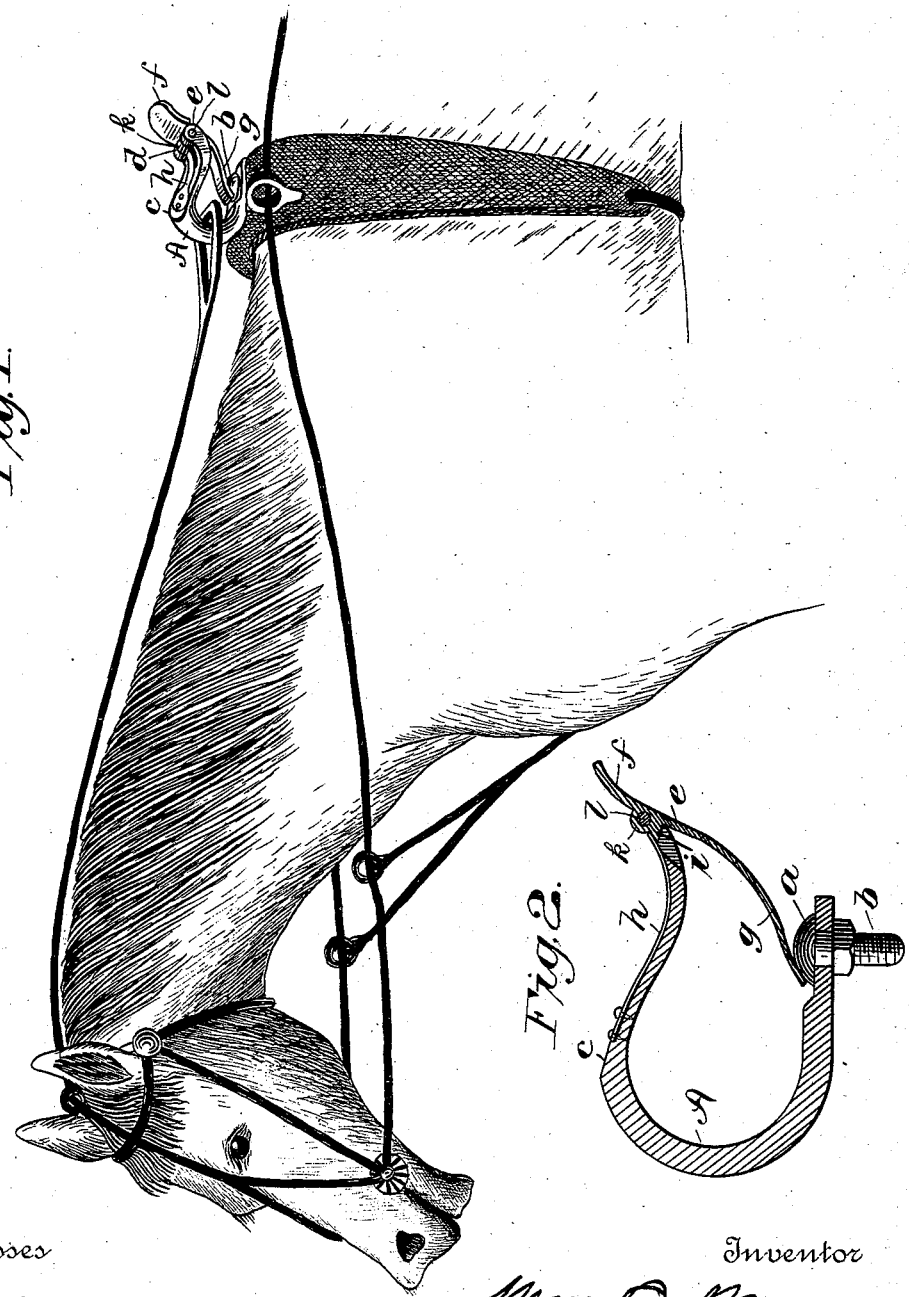
Witnesses
Inventor
Wm. E. Moore,
By his Attorney

UNITED STATES PATENT OFFICE.

WILLIAM E. MOORE, OF CHILLICOTHE, OHIO.

CHECKREIN-HOOK.

SPECIFICATION forming part of Letters Patent No. 376,899, dated January 24, 1888.

Application filed August 4, 1887. Serial No. 246,142. (No model.)

*To all whom it may concern:*

Be it known that I, WILLIAM E. MOORE, a citizen of the United States, residing at Chillicothe, in the county of Ross and State of Ohio, have invented certain new and useful Improvements in Checkrein-Hooks, of which the following is a specification, reference being had therein to the accompanying drawings.

My invention relates to harness-trimmings, and has special reference to improvements in checkrein-hooks.

The object of the invention is to provide a hook from which the rein cannot become detached by the animal tossing his head when fretting or chafing under the bit, or for other causes, but can be readily and easily removed when desired.

The invention will be hereinafter described, and particularly pointed out in the claims.

In the accompanying drawings, which form a part of this specification, Figure 1 is a side view, and Fig. 2 is an enlarged vertical section.

Reference being had to the drawings and the letters marked thereon, A represents the hook, which is provided at its base with an aperture, $a$, for the insertion of a screw-threaded bolt, $b$, for securing the hook to the saddle of the harness.

The body of the hook extends rearward beyond the base, and is broadened and flattened on its upper side, as shown at $c$. In the end of the hook is formed a slot, $d$, in which is pivotally secured a lever, $e$, having a short arm, $f$, which is as broad as the flattened portion $c$, and forms a seat for the thumb or finger of a person to raise the lever and release the rein, and a long narrow arm, $g$, which is curved to correspond with the under side of the broadened portion of the hook, so that it will lie close to the hook and out of the way of the checkrein when it is being removed from the hook.

The lower end of the lever $e$ rests upon the head of the bolt $b$, and is held in such position by a leaf-spring, $h$, which is inserted in and secured to the flattened portion $c$ of the hook. The spring is curved to conform to the curve of the hook, and its rear end rests upon a projection, $i$, formed on the inner side of the lever $e$, just below the enlargement $k$, through which pivot $l$ passes.

It will be observed that the lever is pivoted on one side of its center, the long arm $g$ being on the lower side of the pivot, and as a consequence it will gravitate to its seat, and under ordinary circumstances remain there and prevent the slackened rein from becoming disengaged from the hook; but to insure perfect security against the rein becoming disengaged when the animal is tossing his head I provide the spring $h$, which positively holds the lever down and effectually locks the rein in the hook. When it is desired to release the checkrein for watering the animal, or for any other purpose, the upper end, $f$, of the lever $e$ is pressed backward and downward, when the long arm $g$ will rise and lie close to the under side of the hook, while the short arm $f$ will form an extension of the hook, thus presenting a smooth inner surface of the hook to the passage of the rein out of it. When the lever is released, the spring will return it to its normal position automatically.

To insert the rein, the long arm $g$ of the lever $e$ is moved forward and upward by the entering rein, and is returned by gravity, assisted by the spring $h$.

Having thus fully described my invention, what I claim is—

1. The herein-described checkrein-hook, having a rearwardly-extending flattened arm slotted in its end, in combination with a lever pivoted in the slot of said arm and projecting above and below the same, and a spring secured to the flat side of the arm of the hook and bearing upon the long arm of the lever, which projects below the upper arm of the hook, substantially as described.

2. The hook A, having slot $d$, lever $e$, provided with projection $i$, and pivoted in the free end of the hook, in combination with spring $h$, attached to the hook at one end, and its free end bearing upon the projection $i$ of the lever, substantially as described.

In testimony whereof I affix my signature in presence of two witnesses.

WILLIAM E. MOORE.

Witnesses:
 G. W. THOMPSON,
 W. SCOTT CLARK.